US012809501B2

(12) United States Patent
Oberemk et al.

(10) Patent No.: US 12,809,501 B2
(45) Date of Patent: Nov. 24, 2026

(54) USING A GENERATIVE MACHINE-LEARNING MODEL TO GENERATE A USER INTERFACE WITH VISUALIZATION OF ITEMS OF SELECTED QUANTITIES

(71) Applicant: Maplebear Inc., San Francisco, CA (US)

(72) Inventors: Mark Oberemk, Toronto (CA); Brent Scheibelhut, Toronto (CA); Naval Shah, Toronto (CA); Charles Wesley, San Diego, CA (US)

(73) Assignee: Maplebear Inc., San Francisco, CA (US)

( * ) Notice: Subject to any disclaimer, the term of this patent is extended or adjusted under 35 U.S.C. 154(b) by 280 days.

(21) Appl. No.: 18/814,384

(22) Filed: Aug. 23, 2024

(65) Prior Publication Data

US 2026/0056646 A1 Feb. 26, 2026

(51) Int. Cl.

| | |
|---|---|
| ***G06F 3/0484*** | (2022.01) |
| ***G06F 3/0482*** | (2013.01) |
| ***G06F 9/451*** | (2018.01) |
| ***G06F 40/40*** | (2020.01) |
| ***G06T 11/00*** | (2026.01) |
| ***G06V 10/764*** | (2022.01) |

(52) U.S. Cl.

CPC .......... *G06F 3/0484* (2013.01); *G06F 3/0482* (2013.01); *G06F 9/451* (2018.02); *G06F 40/40* (2020.01); *G06T 11/00* (2013.01); *G06V 10/764* (2022.01); *G06T 2200/24* (2013.01)

(58) Field of Classification Search

CPC ...... G06F 3/0484; G06F 3/0482; G06F 9/451; G06F 40/40; G06T 11/00; G06T 2200/24; G06V 10/764

See application file for complete search history.

(56) References Cited

U.S. PATENT DOCUMENTS

| | | | | |
|---|---|---|---|---|
| 12,118,513 | B1 * | 10/2024 | Lu | G06F 9/451 |
| 2025/0054278 | A1 * | 2/2025 | Araujo | G06Q 30/0641 |
| 2025/0068893 | A1 * | 2/2025 | Bradea | G06N 3/0475 |
| 2025/0086332 | A1 * | 3/2025 | Nehrkorn | G06F 30/13 |
| 2025/0384095 | A1 * | 12/2025 | Chung | G06F 16/9535 |

* cited by examiner

*Primary Examiner* — Justin R. Blaufeld

(74) *Attorney, Agent, or Firm* — Fenwick & West LLP

(57) ABSTRACT

An online system utilizes a generative machine-learning model to generate a user interface of the online system with visualization of items of specific quantities. Upon receiving an interaction with an item on the user interface, the online system identifies a quantity of the item to show in the user interface. Responsive to identifying the quantity of the item, the online system generates a prompt for the generative model, the prompt including the identified quantity of the item, information about a reference object, and a request for generating an image of the identified quantity of the item in the reference object. The online system requests the generative model to generate, by providing the prompt to the generative model, the image of the identified quantity of the item. The online system updates the user interface to display the generated image of the identified quantity of the item in the reference object.

20 Claims, 7 Drawing Sheets

USING A GENERATIVE MACHINE-LEARNING MODEL TO GENERATE A USER INTERFACE WITH VISUALIZATION OF ITEMS OF SELECTED QUANTITIES

BACKGROUND

Online systems are widely used nowadays for placing online orders so that users of the online systems can perform online purchases of various items (e.g., groceries) offered by sources (e.g., retailers). The users often need help understanding how much volume of certain items to buy, such as an ounce of charcuterie or a pound of nuts. Currently, there is a gap in the online shopping experience for bulk items, where users struggle to visually gauge the quantity they are purchasing. This issue is particularly evident in the digital purchase of items both bulk (e.g., nuts or popcorn) and otherwise (e.g., how large is a pound of medium-lean ground beef, or how many fish filets is in 300 g), where understanding the amount in relation to personal containers or common objects is crucial but often difficult. It is often also challenging to visualize online how much it would take to fill a given container, how much deli meat is needed to fill a sandwich or a charcuterie board. etc. Online users are often left estimating how much they need without a clear or interactive visual aid, leading to uncertainty and potential dissatisfaction.

Therefore, it is desirable to develop a system that improves a user interface of the online system to enable automatic and accurate visual representation of various items (e.g., weighted items) that merges the tangible, intuitive shopping experience of in-store visits with the convenience of online purchasing.

SUMMARY

Embodiments of the present disclosure are directed to a generative machine-learning model (e.g., language model) to generate a user interface of an online system with visualization of items (e.g., weighted items) of selected quantities.

In accordance with one or more aspects of the disclosure, the online system receives, via a user interface of a device associated with a user of the online system, an interaction with an item on the user interface. Responsive to the received interaction with the item, the online system identifies a quantity of the item to show in the user interface. Responsive to identifying the quantity of the item, the online system generates a prompt for input into a generative machine-learning model, the prompt including the identifies quantity of the item, information about a reference object, and a request for generating an image of the identified quantity of the item in the reference object. The online system requests the generative machine-learning model to generate, by providing the prompt to the generative machine-learning model, the image of the identified quantity of the item. The online system updates the user interface to display the generated image of the identified quantity of the item in the reference object.

DETAILED DESCRIPTION

Figure 1A:
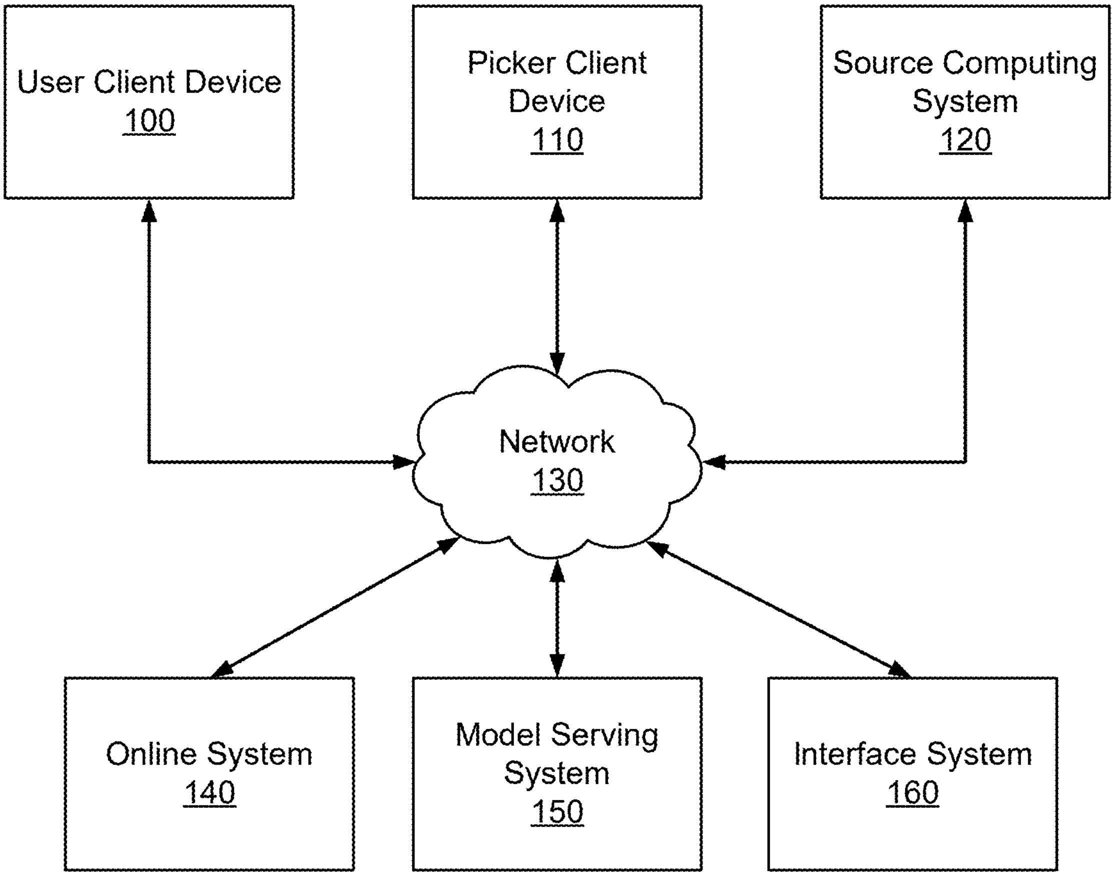
FIG. 1A illustrates an example system environment for an online system, in accordance with one or more embodiments.

FIG. 1A illustrates an example system environment for an online system 140, in accordance with one or more embodiments. The system environment illustrated in FIG. 1A includes a user client device 100, a picker client device 110, a source computing system 120, a network 130, and the online system 140. Alternative embodiments may include more, fewer, or different components from those illustrated in FIG. 1A, and the functionality of each component may be divided between the components differently from the description below. Additionally, each component may perform their respective functionalities in response to a request from a human, or automatically without human intervention.

Although one user client device 100, picker client device 110, and source computing system 120 are illustrated in FIG. 1A, any number of users, pickers, and sources may interact with the online system 140. As such, there may be more than one user client device 100, picker client device 110, or source computing system 120.

The user client device 100 is a client device through which a user may interact with the picker client device 110, the source computing system 120, or the online system 140. The user client device 100 can be a personal or mobile computing device, such as a smartphone, a tablet, a laptop computer, or desktop computer. In some embodiments, the user client device 100 executes a client application that uses an application programming interface (API) to communicate with the online system 140.

A user uses the user client device 100 to place an order with the online system 140. An order specifies a set of items to be delivered to the user. An "item," as used herein, means a good or product that can be provided to the user through the online system 140. The order may include item identifiers (e.g., a stock keeping unit (SKU) or a price look-up (PLU) code) for items to be delivered to the user and may include quantities of the items to be delivered. Additionally, an order may further include a delivery location to which the ordered items are to be delivered and a timeframe during which the items should be delivered. In some embodiments, the order also specifies one or more sources from which the ordered items should be collected.

The user client device 100 presents an ordering interface to the user. The ordering interface is a user interface that the user can use to place an order with the online system 140. The ordering interface may be part of a client application operating on the user client device 100. The ordering interface allows the user to search for items that are available through the online system 140 and the user can select which items to add to an "ordering list." An "ordering list," as used herein, is a tentative set of items that the user has selected for an order but that has not yet been finalized for an order. The ordering list may alternatively be referred to as a "cart" or "shopping cart." The ordering interface allows a user to update the ordering list, e.g., by changing the quantity of items, adding or removing items, or adding instructions for items that specify how the item should be collected.

The user client device 100 may receive additional content from the online system 140 to present to a user. For example, the user client device 100 may receive coupons, recipes, or item suggestions. The user client device 100 may present the received additional content to the user as the user uses the user client device 100 to place an order (e.g., as part of the ordering interface).

Additionally, the user client device 100 includes a communication interface that allows the user to communicate with a picker that is servicing the user's order. This communication interface allows the user to input a text-based message to transmit to the picker client device 110 via the network 130. The picker client device 110 receives the message from the user client device 100 and presents the message to the picker. The picker client device 110 also includes a communication interface that allows the picker to communicate with the user. The picker client device 110 transmits a message provided by the picker to the user client device 100 via the network 130. In some embodiments, messages sent between the user client device 100 and the picker client device 110 are transmitted through the online system 140. In addition to text messages, the communication interfaces of the user client device 100 and the picker client device 110 may allow the user and the picker to communicate through audio or video communications, such as a phone call, a voice-over-IP call, or a video call.

The picker client device 110 is a client device through which a picker may interact with the user client device 100, the source computing system 120, or the online system 140. The picker client device 110 can be a personal or mobile computing device, such as a smartphone, a tablet, a laptop computer, or a desktop computer. In some embodiments, the picker client device 110 executes a client application that uses an application programming interface (API) to communicate with the online system 140.

The picker client device 110 receives orders from the online system 140 for the picker to service. A picker services an order by collecting the items listed in the order from a source. The picker client device 110 presents the items that are included in the user's order to the picker in a collection interface. The collection interface is a user interface that provides information to the picker on which items to collect for a user's order and the quantities of the items. In some embodiments, the collection interface provides multiple orders from multiple users for the picker to service at the same time from the same source location. The collection interface further presents instructions that the user may have included related to the collection of items in the order. Additionally, the collection interface may present a location of each item at the source, and may even specify a sequence in which the picker should collect the items for improved efficiency in collecting items. In some embodiments, the picker client device 110 transmits to the online system 140 or the user client device 100 which items the picker has collected in real time as the picker collects the items.

The picker can use the picker client device 110 to keep track of the items that the picker has collected to ensure that the picker collects all the items for an order. The picker client device 110 may include a barcode scanner that can decode an item identifier encoded in a machine-readable label (e.g., a barcode or a QR code) coupled to an item. The picker client device 110 compares this item identifier to items in the order that the picker is servicing, and if the item identifier corresponds to an item in the order, the picker client device 110 identifies the item as collected. In some embodiments, rather than or in addition to using a barcode scanner, the picker client device 110 captures one or more images of the item and identifies the item identifier for the item based on the images. The picker client device 110 may determine the item identifier directly or by transmitting the images to the online system 140. Furthermore, the picker client device 110 determines weights for items that are priced by weight. The picker client device 110 may prompt the picker to manually input the weight of an item or may communicate with a weighing system in the source location to receive the weight of an item.

When the picker has collected the items for an order, the picker client device 110 instructs a picker on where to deliver the items for a user's order. For example, the picker client device 110 displays a delivery location from the order to the picker. The picker client device 110 also provides navigation instructions for the picker to travel from the source location to the delivery location. When a picker is servicing more than one order, the picker client device 110 identifies which items should be delivered to which delivery location. The picker client device 110 may provide navigation instructions from the source location to each of the delivery locations. The picker client device 110 may receive one or more delivery locations from the online system 140 and may provide the delivery locations to the picker so that the picker can deliver the corresponding one or more orders to those locations. The picker client device 110 may also provide navigation instructions for the picker from the source location from which the picker collected the items to the one or more delivery locations.

In some embodiments, the picker client device 110 tracks the location of the picker as the picker delivers orders to delivery locations. The picker client device 110 collects location data and transmits the location data to the online system 140. The online system 140 may transmit the location data to the user client device 100 for display to the user, so that the user can keep track of when their order will be delivered. Additionally, the online system 140 may generate updated navigation instructions for the picker based on the picker's location. For example, if the picker takes a wrong turn while traveling to a delivery location, the online system 140 determines the picker's updated location based on location data from the picker client device 110 and generates updated navigation instructions for the picker based on the updated location.

In some embodiments, the picker is a single person who collects items for an order from a source location and delivers the order to the delivery location for the order. Alternatively, more than one person may serve the role of a picker for an order. For example, multiple people may collect the items at the source location for a single order. Similarly, the person who delivers an order to its delivery location may be different from the person or people who collected the items from the source location. In these embodiments, each person may have a picker client device 110 that they can use to interact with the online system 140.

Additionally, while the description herein may primarily refer to pickers as humans, in some embodiments, some or all of the steps taken by the picker may be automated. For example, a semi- or fully-autonomous robot may collect items in a source location for an order and an autonomous vehicle may deliver an order to a user from a source location.

In one or more embodiments, the online system 140 communicates with a smart shopping cart being used by a user to collect items in a source location. For example, the smart shopping cart may display content received from the online system 140 and may receive data describing items that are collected by the user and stored in a storage area of the shopping cart. In some embodiments, the smart shopping cart is a picker client device 110 being operated by a picker collecting items within a source location. Similarly, the smart shopping cart may be operated by a user within the source location collecting items for themselves. Example embodiments of smart shopping carts are described in U.S. patent application Ser. No. 18/630,672, entitled "Automated Identification of Items Placed in a Cart and Recommendations based on Same," filed Apr. 9, 2024, which is hereby incorporated by reference in its entirety.

The source computing system 120 is a computing system operated by a source that interacts with the online system 140. As used herein, a "source" is an entity that operates a "source location," which is a store, warehouse, or any other source from which a picker can collect items. The source computing system 120 stores and provides item data to the online system 140 and may regularly update the online system 140 with updated item data. For example, the source computing system 120 provides item data indicating which items are available at a particular source location and the quantities of those items. Additionally, the source computing system 120 may transmit updated item data to the online system 140 when an item is no longer available at the source location. Additionally, the source computing system 120 may provide the online system 140 with updated item prices, sales, or availabilities. Additionally, the source computing system 120 may receive payment information from the online system 140 for orders serviced by the online system 140. Alternatively, the source computing system 120 may provide payment to the online system 140 for some portion of the overall cost of a user's order (e.g., as a commission).

The user client device 100, the picker client device 110, the source computing system 120, and the online system 140 can communicate with each other via the network 130. The network 130 is a collection of computing devices that communicate via wired or wireless connections. The network 130 may include one or more local area networks (LANs) or one or more wide area networks (WANs). The network 130, as referred to herein, is an inclusive term that may refer to any or all of the standard layers used to describe a physical or virtual network, such as the physical layer, the data link layer, the network layer, the transport layer, the session layer, the presentation layer, and the application layer. The network 130 may include physical media for communicating data from one computing device to another computing device, such as multiprotocol label switching (MPLS) lines, fiber optic cables, cellular connections (e.g., 3G, 4G, or 5G spectra), or satellites. The network 130 also may use networking protocols, such as TCP/IP, HTTP, SSH, SMS, or FTP, to transmit data between computing devices. In some embodiments, the network 130 may include Bluetooth or near-field communication (NFC) technologies or protocols for local communications between computing devices. The network 130 may transmit encrypted or unencrypted data.

The online system 140 is an online system by which users can order items to be provided to them by a picker from a source. The online system 140 receives orders from a user client device 100 through the network 130. The online system 140 selects a picker to service the user's order and transmits the order to a picker client device 110 associated with the picker. If the picker accepts the order, the picker collects the ordered items from a source location and delivers the ordered items to the user. The online system 140 may charge a user for the order and provide portions of the payment from the user to the picker and the source.

As an example, the online system 140 may allow a user to order groceries from a grocery store source. The user's order may specify which groceries they want to be delivered from the grocery store and the quantities of each of the groceries. The user's client device 100 transmits the user's order to the online system 140 and the online system 140 selects a picker to travel to the grocery store source location to collect the groceries ordered by the user. The online system transmits an offer to the picker for the picker to service the order in exchange for consideration and, if the picker accepts the offer, the picker collects the groceries from the grocery store. Once the picker has collected the groceries ordered by the user, the picker delivers the groceries to a location transmitted to the picker client device 110 by the online system 140.

The online system 140 enables users to place orders for items, such as grocery items, for which specifying a quantity may be difficult. For example, a user of the online system 140 may not understand how much of ½ lbs. of deli meat is. To help a user of the online system 140 visualize a quantity of an item, the online system 140 generates a user interface that displays, next to a user interface element for selecting the quantity of the item, an image of the specified quantity. The image of the quantity of the item may be generated by a generative machine-learning model, such as a language model integrated with the online system 140. The user can further select a context for the image, such as showing the item in a bowl, on a sheet, or next to a custom uploaded container or image. When the user changes the quantity of the item, the generative machine-learning model generates the user interface that updates the display to reflect the change.

Hence, the online system 140 presented herein utilizes the generative machine-learning model (e.g., language model) to generate a user interface that displays, when a user of the online system 140 selects a quantity for an item, an image that shows the selected quantity of the item with a reference object. The user interface allows the user to upload their own reference object or container (e.g., bowl), and the generative machine-learning model can be prompted to draw the item in that reference object/container. The online system 140 thus utilizes the generative machine-learning model to visually represent an order of a weighted item within a prebuilt visual context, such as a user's storage container.

The innovative approach presented herein further leverages the generative machine-learning model to dynamically create images for personalized food orders placed by users of the online system 140 at sources (e.g., retailers) and restaurants associated with the online system 140. For example, when a user of the online system 140 orders a customized pizza with specific toppings, the generative machine-learning model generates a user interface with an image reflecting the user's choices, allowing the user to visualize the pizza before purchase. Similarly, when ordering a birthday cake, a user of the online system 140 can see an image of the birthday cake with their custom message as generated by the generative machine-learning model. This personalized visual representation enhances the user experience, increases satisfaction, and potentially boosts sales.

The model serving system 150 receives requests from the online system 140 to perform tasks using machine-learning models. The tasks include, but are not limited to, natural language processing (NLP) tasks, audio processing tasks, image processing tasks, video processing tasks, and the like. In one or more embodiments, the machine-learning models deployed by the model serving system 150 are language models configured to perform one or more NLP tasks. The NLP tasks include, but are not limited to, text generation, query processing, machine translation, chatbots, and the like. In one or more embodiments, a language model of the model serving system 150 is configured as a transformer neural network architecture (i.e., a transformer model). Specifically, the transformer model is coupled to receive sequential data tokenized into a sequence of input tokens and generates a sequence of output tokens depending on the task to be performed.

The model serving system 150 receives a request including input data (e.g., text data, audio data, image data, or video data) and encodes the input data into a set of input tokens. The model serving system 150 applies the machine-learning model to generate a set of output tokens. Each token in the set of input tokens or the set of output tokens may correspond to a text unit. For example, a token may correspond to a word, a punctuation symbol, a space, a phrase, a paragraph, and the like. For an example query processing task, the language model may receive a sequence of input tokens that represent a query and generate a sequence of output tokens that represent a response to the query. For a translation task, the transformer model may receive a sequence of input tokens that represent a paragraph in German and generate a sequence of output tokens that represents a translation of the paragraph or sentence in English. For a text generation task, the transformer model may receive a prompt and continue the conversation or expand on the given prompt in human-like text.

When the machine-learning model is a language model, the sequence of input tokens or output tokens are arranged as a tensor with one or more dimensions, for example, one dimension, two dimensions, or three dimensions. For example, one dimension of the tensor may represent the number of tokens (e.g., length of a sentence), one dimension of the tensor may represent a sample number in a batch of input data that is processed together, and one dimension of the tensor may represent a space in an embedding space. However, it is appreciated that in other embodiments, the input data or the output data may be configured as any number of appropriate dimensions depending on whether the data is in the form of image data, video data, audio data, and the like. For example, for three-dimensional image data, the input data may be a series of pixel values arranged along a first dimension and a second dimension, and further arranged along a third dimension corresponding to RGB channels of the pixels.

In one or more embodiments, the language models are large language models (LLMs) that are trained on a large corpus of training data to generate outputs for the NLP tasks. An LLM may be trained on massive amounts of text data, often involving billions of words or text units. The large amount of training data from various data sources allows the LLM to generate outputs for many tasks. An LLM may have a significant number of parameters in a deep neural network (e.g., transformer architecture), for example, at least 1 billion, at least 15 billion, at least 135 billion, at least 175 billion, at least 500 billion, at least 1 trillion, at least 1.5 trillion parameters.

Since an LLM has significant parameter size and the amount of computational power for inference or training the LLM is high, the LLM may be deployed on an infrastructure configured with, for example, supercomputers that provide enhanced computing capability (e.g., graphic processor units) for training or deploying deep neural network models. In one instance, the LLM may be trained and deployed or hosted on a cloud infrastructure service. The LLM may be pre-trained by the online system 140 or one or more entities different from the online system 140. An LLM may be trained on a large amount of data from various data sources. For example, the data sources include websites, articles, posts on the web, and the like. From this massive amount of data coupled with the computing power of LLM, the LLM is able to perform various tasks and synthesize and formulate output responses based on information extracted from the training data.

In one or more embodiments, when the machine-learning model including the LLM is a transformer-based architecture, the transformer has a generative pre-training (GPT) architecture including a set of decoders that each perform one or more operations to input data to the respective decoder. A decoder may include an attention operation that generates keys, queries, and values from the input data to the decoder to generate an attention output. In one or more other embodiments, the transformer architecture may have an encoder-decoder architecture and includes a set of encoders coupled to a set of decoders. An encoder or decoder may include one or more attention operations.

While a LLM with a transformer-based architecture is described in one or more embodiments, it is appreciated that in other embodiments, the language model can be configured as any other appropriate architecture including, but not limited to, long short-term memory (LSTM) networks, Markov networks, BART, generative-adversarial networks (GAN), diffusion models (e.g., Diffusion-LM), and the like.

The online system 140 may employ an LLM of the model serving system 150 to implement the generative machine-learning model that generates a user interface displaying, next to a user interface element for selecting a quantity of an item, an image of the item quantity as specified by a user of the online system 140. The online system 140 may prepare (e.g., via a prompt generation module 250 in FIG. 2) a prompt for input to the LLMs. The prompt may include an image with a reference object (e.g., container) to fill, a description of a common container style (e.g., measuring cup, platter, half-sheet baking tray, etc.), estimated dimensions for the reference object, an item, a quantity for the item (e.g., measured in terms of estimated volume), a common reference item (or items, such as a ruler, or a soda can) to inject into the image to provide the user with scale, some other input that helps visualizing the quantity of the item, or some combination thereof.

The LLM may generate a response to the prompt based on execution of the machine-learning model using the prompt. The response may include an image projecting the item at the selected quantity into the container. The online system 140 may import the response from the model serving system 150 and use the response to generate a user interface of the user client device 100.

In one or more embodiments, the model serving system 150 performs initial tuning of a set of parameters of the LLM using cold start data. The cold start data may include a large set of labeled imagery of a collection of items in various known quantities (e.g., a series of photos of 100 g, 500 g and 10 kg of almonds) and in various container shapes (e.g., bowl, plastic box, long serving tray, etc.).

In one or more embodiments, the task for the model serving system 150 is based on knowledge of the online system 140 that is fed to the machine-learning model of the model serving system 150, rather than relying on general knowledge encoded in the model weights of the model. Thus, one objective may be to perform various types of queries on the external data in order to perform any task that the machine-learning model of the model serving system 150 could perform. For example, the task may be to perform question-answering, text summarization, text generation, and the like based on information contained in an external dataset.

Thus, in one or more embodiments, the online system 140 is connected to an interface system 160. The interface system 160 receives external data from the online system 140 and builds a structured index over the external data using, for example, another machine-learned language model or heuristics. The interface system 160 receives one or more queries from the online system 140 on the external data. The interface system 160 constructs one or more prompts for input to the model serving system 150. A prompt may include the query of the user and context obtained from the structured index of the external data. In one instance, the context in the prompt includes portions of the structured indices as contextual information for the query. The interface system 160 obtains one or more responses from the model serving system 150 and synthesizes a response to the query on the external data. While the online system 140 can generate a prompt using the external data as context, often times, the amount of information in the external data exceeds prompt size limitations configured by the machine-learning language model. The interface system 160 can resolve prompt size limitations by generating a structured index of the data and offers data connectors to external data sources.

Figure 1B:
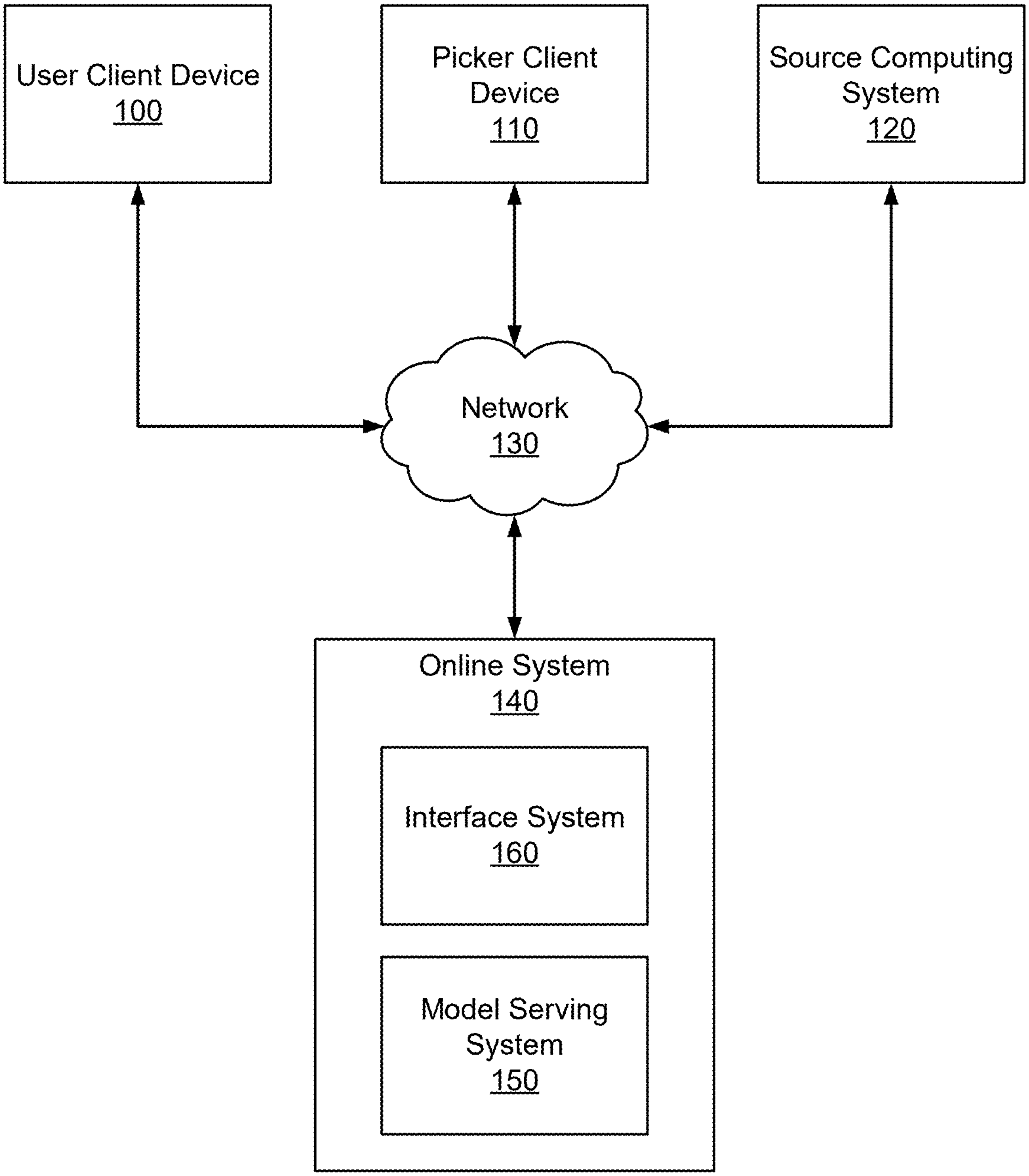
FIG. 1B illustrates an example system environment for an online system, in accordance with one or more embodiments.

FIG. 1B illustrates an example system environment for an online system 140, in accordance with one or more embodiments. The system environment illustrated in FIG. 1B includes a user client device 100, a picker client device 110, a source computing system 120, a network 130, and an online system 140. Alternative embodiments may include more, fewer, or different components from those illustrated in FIG. 1B, and the functionality of each component may be divided between the components differently from the description below. Additionally, each component may perform their respective functionalities in response to a request from a human, or automatically without human intervention.

The example system environment in FIG. 1A illustrates an environment where the model serving system 150 and/or the interface system 160 is managed by a separate entity from the online system 140. In one or more embodiments, as illustrated in the example system environment in FIG. 1B, the model serving system 150 and/or the interface system 160 is managed and deployed by the entity managing the online system 140. The online system 140 is described in further detail below with regards to FIG. 2.

Figure 2:
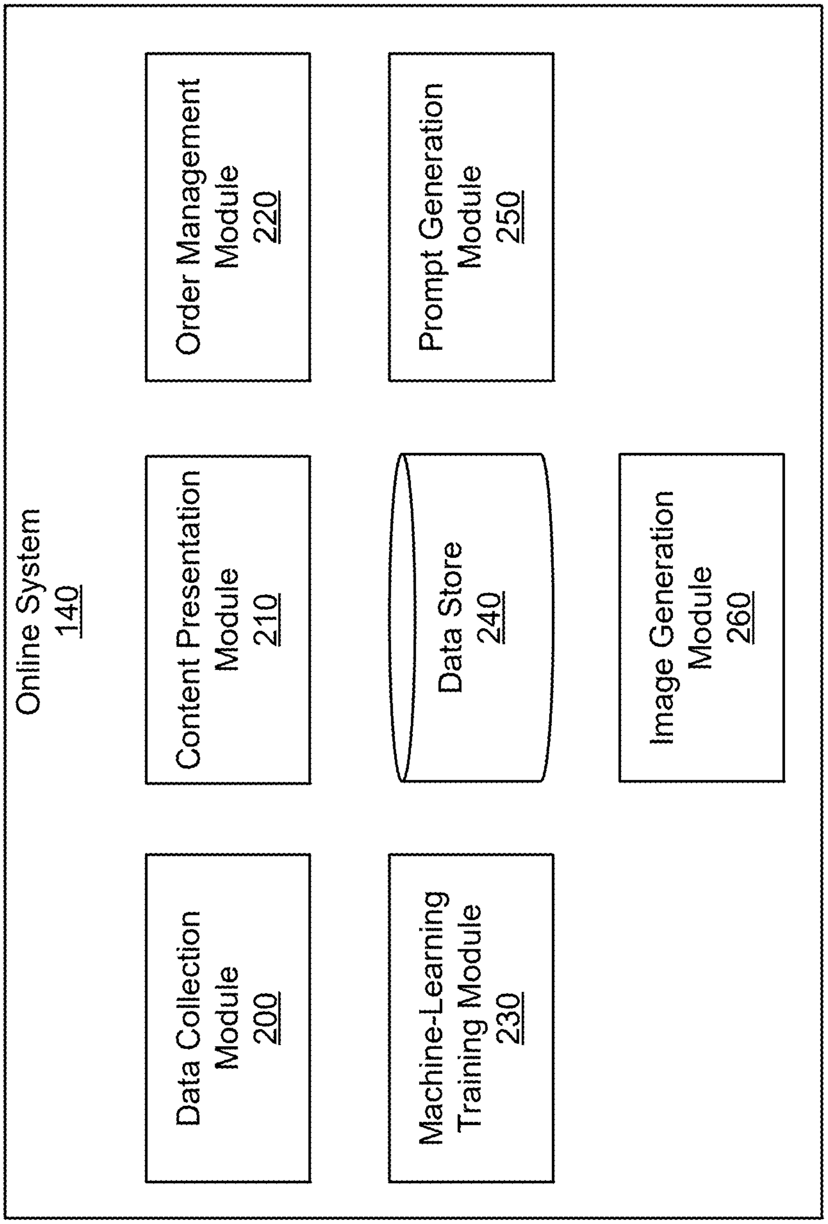
FIG. 2 illustrates an example system architecture for an online system, in accordance with one or more embodiments.

FIG. 2 illustrates an example system architecture for the online system 140, in accordance with some embodiments. The system architecture illustrated in FIG. 2 includes a data collection module 200, a content presentation module 210, an order management module 220, a machine-learning training module 230, a data store 240, a prompt generation module 250, and an image generation module 260. Alternative embodiments may include more, fewer, or different components from those illustrated in FIG. 2, and the functionality of each component may be divided between the components differently from the description below. Additionally, each component may perform their respective functionalities in response to a request from a human, or automatically without human intervention.

The data collection module 200 collects data used by the online system 140 and stores the data in the data store 240. In preferred embodiments, the data collection module 200 only collects data describing a user if the user has previously explicitly consented to the online system 140 collecting data describing the user. Additionally, the data collection module 200 may encrypt all data, including sensitive or personal data, describing users.

For example, the data collection module 200 collects user data, which is information or data that describe characteristics of a user. User data may include a user's name, address, shopping preferences, favorite items, or stored payment instruments. The user data also may include default settings established by the user, such as a default source/source location, payment instrument, delivery location, or delivery timeframe. The data collection module 200 may collect the user data from sensors on the user client device 100 or based on the user's interactions with the online system 140.

The data collection module 200 also collects item data, which is information or data that identifies and describes items that are available at a source location. The item data may include item identifiers for items that are available and may include quantities of items associated with each item identifier. Additionally, item data may also include attributes of items such as the size, color, weight, stock keeping unit (SKU), or serial number for the item. The item data may further include purchasing rules associated with each item, if they exist. For example, age-restricted items such as alcohol and tobacco are flagged accordingly in the item data. Item data may also include information that is useful for predicting the availability of items in source locations. For example, for each item-source combination (a particular item at a particular warehouse), the item data may include a time that the item was last found, a time that the item was last not found (a picker looked for the item but could not find it), the rate at which the item is found, or the popularity of the item. The data collection module 200 may collect item data from the source computing system 120, the picker client device 110, or the user client device 100.

An item category is a set of items that are a similar type of item. Items in an item category may be considered to be equivalent to each other or may be replacements for each other in an order. For example, different brands of sourdough bread may be different items, but these items may be in a "sourdough bread" item category. The item categories may be human-generated and human-populated with items. The item categories also may be generated automatically by the online system 140 (e.g., using a clustering algorithm).

The data collection module 200 also collects picker data, which is information or data that describes characteristics of pickers. For example, the picker data for a picker may include the picker's name, the picker's location, how often the picker has serviced orders for the online system 140, a user rating for the picker, which sources the picker has collected items at, or the picker's previous shopping history. Additionally, the picker data may include preferences expressed by the picker, such as their preferred sources to collect items at, how far they are willing to travel to deliver items to a user, how many items they are willing to collect at a time, timeframes within which the picker is willing to service orders, or payment information by which the picker is to be paid for servicing orders (e.g., a bank account). The data collection module 200 collects picker data from sensors of the picker client device 110 or from the picker's interactions with the online system 140.

Additionally, the data collection module 200 collects order data, which is information or data that describes characteristics of an order. For example, order data may include item data for items that are included in the order, a delivery location for the order, a user associated with the order, a source location from which the user wants the ordered items collected, or a timeframe within which the user wants the order delivered. Order data may further include information describing how the order was serviced, such as which picker serviced the order, when the order was delivered, or a rating that the user gave the delivery of the order. In some embodiments, the order data includes user data for users associated with the order, such as user data for a user who placed the order or picker data for a picker who serviced the order.

While user data, picker data, source data, item data, and order data are described separately, data collected by the data collection module 200 may fall into more than one of these categories. For example, data describing a picker's performance for an order may be order data and picker data.

The content presentation module 210 selects content for presentation to a user. For example, the content presentation module 210 selects which items to present to a user while the user is placing an order. The content presentation module 210 generates and transmits an ordering interface for the user to order items. The content presentation module 210 populates the ordering interface with items that the user may select for adding to their order. In some embodiments, the content presentation module 210 presents a catalog of all items that are available to the user, which the user can browse to select items to order. The content presentation module 210 also may identify items that the user is most likely to order and present those items to the user. For example, the content presentation module 210 may score items and rank the items based on their scores. The content presentation module 210 displays the items with scores that exceed some threshold (e.g., the top n items or the p percentile of items).

The content presentation module 210 may use an item selection model to score items for presentation to a user. An item selection model is a machine-learning model that is trained to score items for a user based on item data for the items and user data for the user. For example, the item selection model may be trained to determine a likelihood that the user will order the item. In some embodiments, the item selection model uses item embeddings describing items and user embeddings describing users to score items. These item embeddings and user embeddings may be generated by separate machine-learning models and may be stored in the data store 240.

In some embodiments, the content presentation module 210 scores items based on a search query received from the user client device 100. A search query is free text for a word or set of words that indicate items of interest to the user. The content presentation module 210 scores items based on a relatedness of the items to the search query. For example, the content presentation module 210 may apply natural language processing (NLP) techniques to the text in the search query to generate a search query representation (e.g., an embedding) that represents characteristics of the search query. The content presentation module 210 may use the search query representation to score candidate items for presentation to a user (e.g., by comparing a search query embedding to an item embedding).

In some embodiments, the content presentation module 210 scores items based on a predicted availability of an item. The content presentation module 210 may use an availability model to predict the availability of an item. An availability model is a machine-learning model that is trained to predict the availability of an item at a particular source location. For example, the availability model may be trained to predict a likelihood that an item is available at a source location or may predict an estimated number of items that are available at a source location. The content presentation module 210 may apply a weight to the score for an item based on the predicted availability of the item. Alternatively, the content presentation module 210 may filter out items from presentation to a user based on whether the predicted availability of the item exceeds a threshold.

The order management module 220 manages orders for items from users. The order management module 220 receives orders from a user client device 100 and offers the orders to pickers for service based on picker data. For example, the order management module 220 offers an order to a picker based on the picker's location and the location of the source from which the ordered items are to be collected. The order management module 220 may also offer an order to a picker based on how many items are in the order, a vehicle operated by the picker, the delivery location, the picker's preferences on how far to travel to deliver an order, the picker's ratings by users, or how often a picker agrees to service an order.

In some embodiments, the order management module 220 determines when to offer an order to a picker based on a delivery timeframe requested by the user with the order. The order management module 220 computes an estimated amount of time that it would take for a picker to collect the items for an order and deliver the ordered items to the delivery location for the order. The order management module 220 offers the order to a picker at a time such that, if the picker immediately accepts and services the order, the picker is likely to deliver the order at a time within the requested timeframe. Thus, when the order management module 220 receives an order, the order management module 220 may delay offering the order to a picker if the requested timeframe is far enough in the future (i.e., the picker may be offered the order at a later time and is still predicted to meet the requested timeframe).

When the order management module 220 offers an order to a picker, the order management module 220 transmits the order to the picker client device 110 associated with the picker. The order management module 220 may also transmit navigation instructions from the picker's current location to the source location associated with the order. If the order includes items to collect from multiple source locations, the order management module 220 identifies the source locations to the picker and may also specify a sequence in which the picker should visit the source locations.

The order management module 220 may track the location of the picker through the picker client device 110 to determine when the picker arrives at the source location. When the picker arrives at the source location, the order management module 220 transmits the order to the picker client device 110 for display to the picker. As the picker uses the picker client device 110 to collect items at the source location, the order management module 220 receives item identifiers for items that the picker has collected for the order. In some embodiments, the order management module 220 receives images of items from the picker client device 110 and applies computer-vision techniques to the images to identify the items depicted by the images. The order management module 220 may track the progress of the picker as the picker collects items for an order and may transmit progress updates to the user client device 100 that describe which items have been collected for the user's order.

In some embodiments, the order management module 220 tracks the location of the picker within the source location. The order management module 220 uses sensor data from the picker client device 110 or from sensors in the source location to determine the location of the picker in the source location. The order management module 220 may transmit, to the picker client device 110, instructions to display a map of the source location indicating where in the source location the picker is located. Additionally, the order management module 220 may instruct the picker client device 110 to display the locations of items for the picker to collect, and may further display navigation instructions for how the picker can travel from their current location to the location of the next item to collect for an order.

The order management module 220 determines when the picker has collected the items for an order. For example, the order management module 220 may receive a message from the picker client device 110 indicating that all of the items for an order have been collected. Alternatively, the order management module 220 may receive item identifiers for items collected by the picker and determine when all of the items in an order have been collected. When the order management module 220 determines that the picker has completed an order, the order management module 220 transmits the delivery location for the order to the picker client device 110. The order management module 220 may also transmit navigation instructions to the picker client device 110 that specify how to travel from the source location to the delivery location, or to a subsequent source location for further item collection. The order management module 220 tracks the location of the picker as the picker travels to the delivery location for an order, and updates the user with the location of the picker so that the user can track the progress of the order. In some embodiments, the order management module 220 computes an estimated time of arrival of the picker at the delivery location and provides the estimated time of arrival to the user.

In some embodiments, the order management module 220 facilitates communication between the user client device 100 and the picker client device 110. As noted above, a user may use a user client device 100 to send a message to the picker client device 110. The order management module 220 receives the message from the user client device 100 and transmits the message to the picker client device 110 for presentation to the picker. The picker may use the picker client device 110 to send a message to the user client device 100 in a similar manner.

The order management module 220 coordinates payment by the user for the order. The order management module 220 uses payment information provided by the user (e.g., a credit card number or a bank account) to receive payment for the order. In some embodiments, the order management module 220 stores the payment information for use in subsequent orders by the user. The order management module 220 computes the total cost for the order and charges the user that cost. The order management module 220 may provide a portion of the total cost to the picker for servicing the order, and another portion of the total cost to the source.

The machine-learning training module 230 trains machine-learning models used by the online system 140. The online system 140 may use machine-learning models to perform functionalities described herein. Example machine-learning models include regression models, support vector machines, naïve Bayes, decision trees, k nearest neighbors, random forest, boosting algorithms, k-means, and hierarchical clustering. The machine-learning models may also include neural networks, such as perceptrons, multilayer perceptrons, convolutional neural networks, recurrent neural networks, sequence-to-sequence models, generative adversarial networks, transformers, large-language models, or multi-modal large language models. A machine-learning model may include components relating to these different general categories of model, which may be sequenced, layered, or otherwise combined in various configurations. While the term "machine-learning model" may be broadly used herein to refer to any kind of machine-learning model, the term is generally limited to those types of models that are suitable for performing the described functionality. For example, certain types of machine-learning models can perform a particular functionality based on the intended inputs to, and outputs from, the model, the capabilities of the system on which the machine-learning model will operate, or the type and availability of training data for the model.

Each machine-learning model includes a set of parameters. The set of parameters for a machine-learning model are parameters that the machine-learning model uses to process an input to generate an output. For example, a set of parameters for a linear regression model may include weights that are applied to each input variable in the linear combination that comprises the linear regression model. Similarly, the set of parameters for a neural network may include weights and biases that are applied at each neuron in the neural network. The machine-learning training module 230 generates the set of parameters (e.g., the particular values of the parameters) for a machine-learning model by "training" the machine-learning model. Once trained, the machine-learning model uses the set of parameters to transform inputs into outputs.

The machine-learning training module 230 trains a machine-learning model based on a set of training examples. Each training example includes input data to which the machine-learning model is applied to generate an output. For example, each training example may include user data, picker data, item data, or order data. In some cases, the training examples also include a label which represents an expected output of the machine-learning model. In these cases, the machine-learning model is trained by comparing its output from the input data of a training example to the label for the training example. In general, during training with labeled data, the set of parameters of the model may be set or adjusted to reduce a difference between the output for the training example (given the current parameters of the model) and the label for the training example.

The machine-learning training module 230 may apply an iterative process to train a machine-learning model whereby the machine-learning training module 230 updates parameter values of the machine-learning model based on each of the set of training examples. The training examples may be processed together, individually, or in batches. To train a machine-learning model based on a training example, the machine-learning training module 230 applies the machine-learning model to the input data in the training example to generate an output based on a current set of parameter values. The machine-learning training module 230 scores the output from the machine-learning model using a loss function. A loss function is a function that generates a score for the output of the machine-learning model such that the score is higher when the machine-learning model performs poorly and lower when the machine-learning model performs well. In cases where the training example includes a label, the loss function is also based on the label for the training example. Some example loss functions include the mean square error function, the mean absolute error, hinge loss function, and the cross entropy loss function. The machine-learning training module 230 updates the set of parameters for the machine-learning model based on the score generated by the loss function. For example, the machine-learning training module 230 may apply gradient descent to update the set of parameters.

In some embodiments, the machine-learning training module 230 may retrain the machine-learning model based on the actual performance of the model after the online system 140 has deployed the model to provide service to users. For example, if the machine-learning model is used to predict a likelihood of an outcome of an event, the online system 140 may log the prediction and an observation of the actual outcome of the event. Alternatively, if the machine-learning model is used to classify an object, the online system 140 may log the classification as well as a label indicating a correct classification of the object (e.g., following a human labeler or other inferred indication of the correct classification). After sufficient additional training data has been acquired, the machine-learning training module 230 re-trains the machine-learning model using the additional training data, using any of the methods described above. This deployment and re-training process may be repeated over the lifetime use for the machine-learning model. This way, the machine-learning model continues to improve its output and adapts to changes in the system environment, thereby improving the functionality of the online system 140 as a whole in its performance of the tasks described herein.

The data store 240 stores data used by the online system 140. For example, the data store 240 stores user data, item data, order data, and picker data for use by the online system 140. The data store 240 also stores trained machine-learning models trained by the machine-learning training module 230. For example, the data store 240 may store the set of parameters for a trained machine-learning model on one or more non-transitory, computer-readable media. The data store 240 uses computer-readable media to store data, and may use databases to organize the stored data.

With respect to the machine-learning models hosted by the model serving system 150, the machine-learning models may already be trained by a separate entity from the entity responsible for the online system 140. In one or more other embodiments, when the model serving system 150 is included in the online system 140, the machine-learning training module 230 may further train parameters of the machine-learning model based on data specific to the online system 140 stored in the data store 240. As an example, the machine-learning training module 230 may obtain a pre-trained transformer language model and further fine tune the parameters of the transformer language model using training data stored in the data store 240. The machine-learning training module 230 may provide the transformer language model to the model serving system 150 for deployment.

A user of the online system 140 may utilize a user interface of the user client device 100 to click on an item to add the item to a shopping cart. The user interface may show user interface elements that allow the user to select a quantity of the item. Next to the quantity selection user interface element, the user interface may show an image of the currently selected quantity that is generated by the generative machine-learning model (e.g., language model or LLM of the model serving system 150). In one or more embodiments, the online system 140 triggers generation of the image by the LLM under certain conditions, such as only for certain types of items (e.g., as determined based on a taxonomy node of an item) and/or only for items that the user does not regularly purchase.

The prompt generation module 250 may prompt the LLM to generate an image of a selected quantity of an item. The prompt generation module 250 may generate a prompt for input into the LLM. The prompt may include a set of inputs for generating the image. In providing the set of inputs to the LLM, the prompt generation module 250 may provide an image with a reference object (e.g., container) to fill, a description of a common container style (e.g., measuring cup, platter, half-sheet baking tray, etc.), estimated dimensions for the reference object, an item, a quantity for the item (e.g., measured in terms of estimated volume), a common reference item (or items, such as a ruler, or a soda can) to inject into the image to provide the user with a scale, some other input that facilitates visualizing the quantity of the item, or some combination thereof.

Figure 3A:
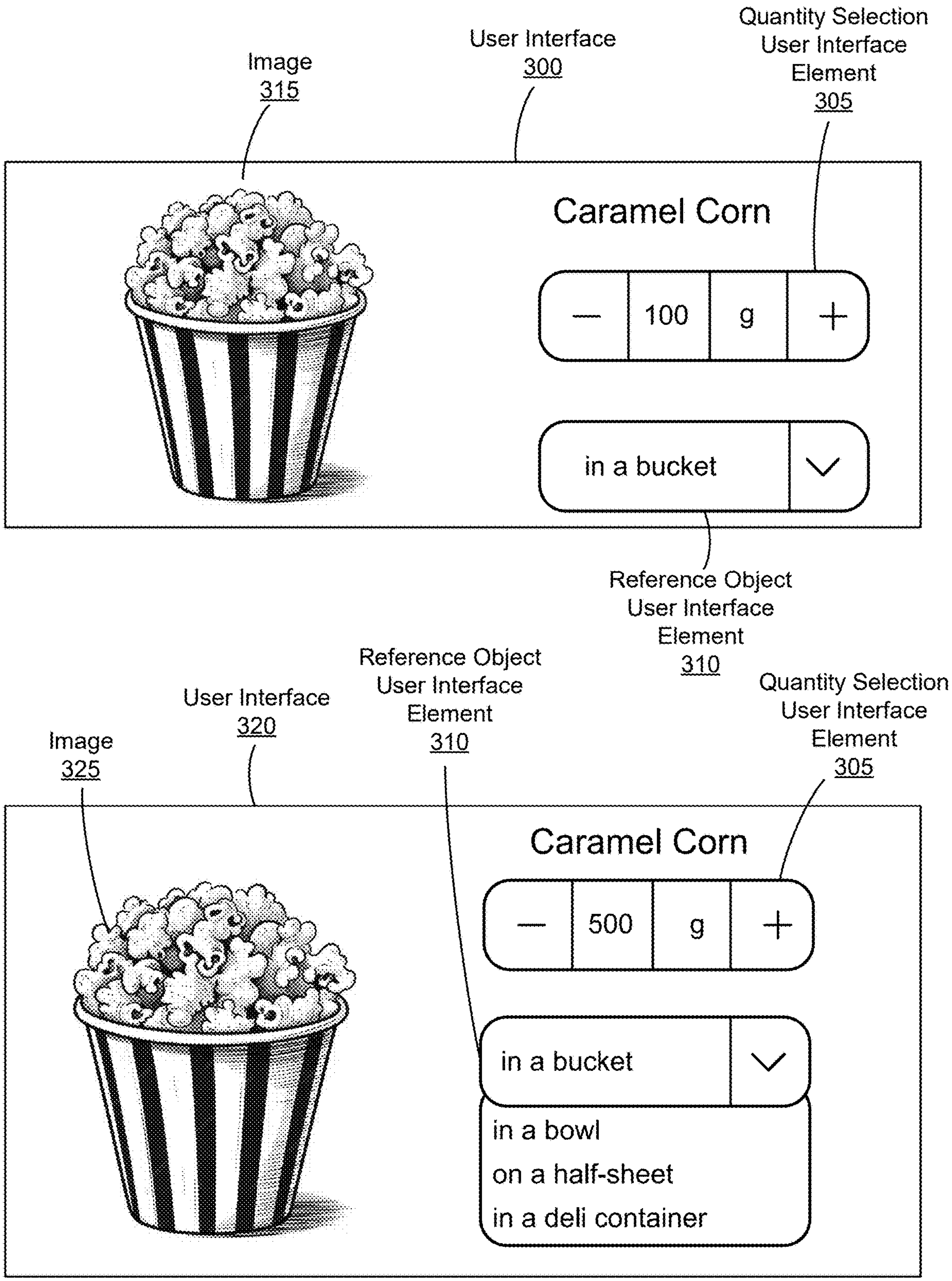
FIG. 3A illustrates example user interfaces of a device associated with a user of the online system with images of an item with different selected quantities as generated by a language model, in accordance with one or more embodiments.
Figure 3B:
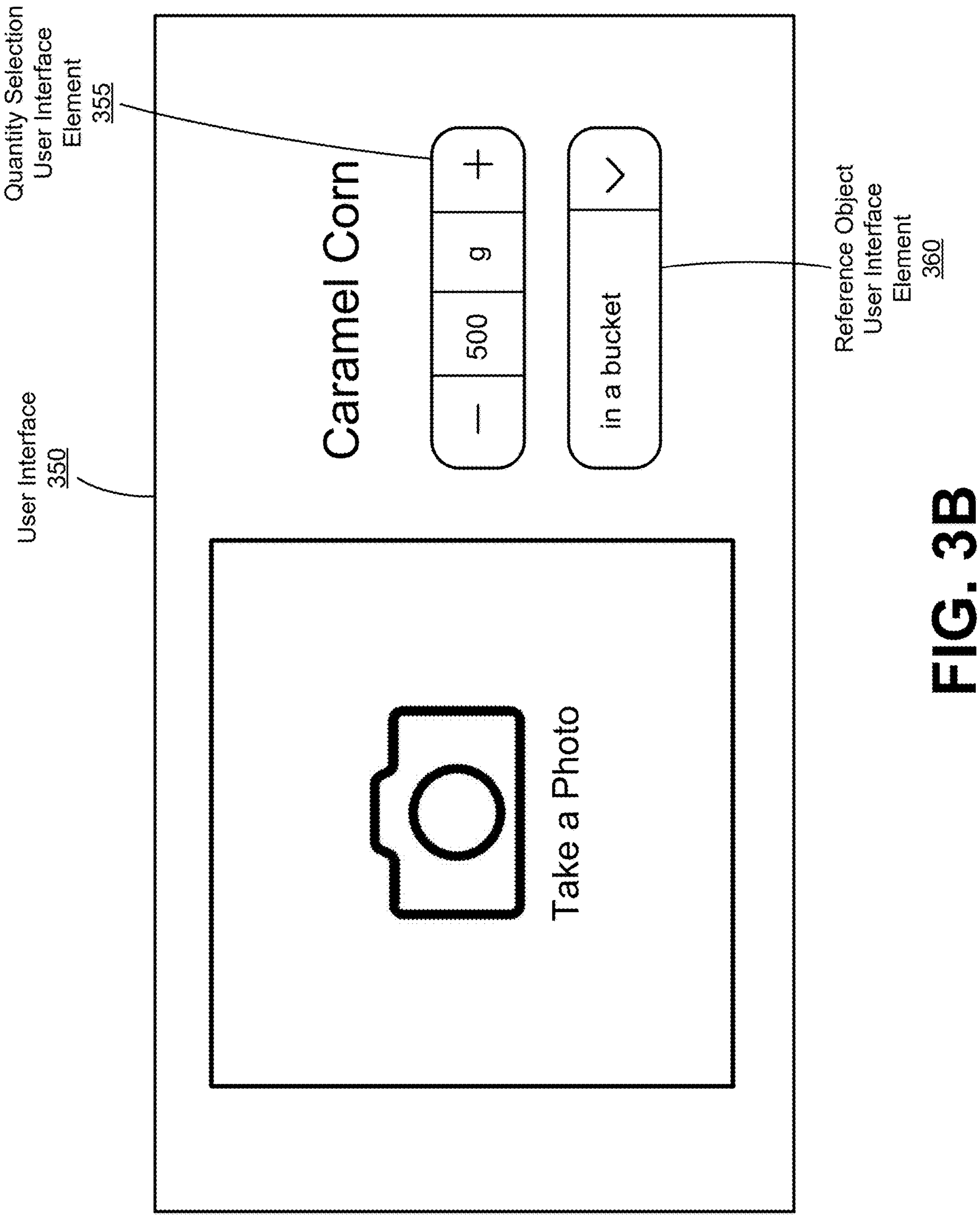
FIG. 3B illustrates an example user interface of a device associated with a user of the online system that allows the user to take and upload an image of a container, in accordance with one or more embodiments.

The prompt generation module 250 may further include a request into the prompt to ask the LLM to draw the image of the selected quantity of the item, e.g., next to the reference object or inside the reference object. The user may further utilize the user interface of the user client device 100 to select a desired reference object (e.g., from a dropdown menu, as shown in FIG. 3A). Alternatively or additionally, the user may utilize the user interface of the user client device 100 to upload an image of a user's reference object (e.g., bowl, cupboard, etc., as shown in FIG. 3B). Alternatively or additionally, the prompt may also include container measurements as provided by the user or extracted via the prompt generation module 250. In such cases, the user may use a camera of the user client device 100 to take a photo a specific user's container (e.g., instead of a stock container) that would be filled with a selected quantity of item by a language model algorithm.

Based on the prompt input into the LLM, the LLM may generate an image projecting an item at a selected quantity into the reference object (e.g., container). The LLM may be thus provided with a specific item (e.g., popcorn) and a target quantity, wherein the target quantity may be defined as either a mass or a volume, and the LLM may return an image of the item at the specified amount. The online system 140 may import the generated image from the model serving system 150, e.g., via the image generation module 260. The image generation module 260 may generate a user interface of the user client device 100 that displays the image of the item at the selected quantity placed into the reference object. Each time the user updates a selected quantity of the item, the language model algorithm performed by the LLM may be repeated and an updated image of an updated quantity of the item may be generated. The image generation module 260 may import the updated image from the model serving system 150 and generate an updated user interface of the user client device 100 that displays the updated image. A requirement for images generated by the LLM would be that each generated image may include at least one of two features: (i) a recognizable, known-to-the-system container (e.g., 1 qt popcorn container); and (ii) an item for scale from which the container size can be derived (e.g., a pencil, an almond, a soda can, etc.).

In one or more embodiments, the image generation module 260 utilizes one or more image analysis techniques to derive an estimated size and dimensions of a provided container. Details about the estimated size and dimensions of the container may be then fed not the LLM along with a basic image of the container, and the LLM may generate an image of a selected quantity of item within a platform-default container. Alternatively or additionally, a user of the online system 140 may utilize a user interface of the user client device 100 to explicitly enter an estimated volume for the container as an input to the LLM and account for any irregular shapes, such as irregular decanters. Once analyzed, the containers utilized by the user may be stored on a users' profile (e.g., at the data store 240) for ongoing future usage similarly to the built-in container options of the online system 140 for any items which the user orders in the future.

In one or more embodiments, a user of the online system 140 utilizes a user interface of the user client device 100 to continuously upload images of the same container at varying levels of "full," prompting the image generation module 260 to provide an estimate of the quantity required to replenish the container from the current state of container back to the full container. Alternatively or additionally, the user may pick two or more items to put in a container (e.g., an assorted candy dish), prompting the LLM to generate an image as a combination of multiple quantities of different items. The image generation module 260 may import the combination image and generate a user interface of the user client device that displays the combination image.

In one or more embodiments, in addition to an item quantity, the LLM is tuned to suggest certain items (e.g., items from within the same taxonomy node as the original item) to a user of the online system 140. In such cases, the prompt generation module 250 may generate a prompt for input into the LLM that includes information about a container and a request for generating recommendation for items including corresponding images, such as, "I'm refilling my candy dish again, give me a few ideas for what to replenish it with and show me how much I should buy."

In one or more embodiments, the LLM is tuned (e.g., via the model serving system 150) using a collection of images of known quantity in various types of containers, so that the LLM improves at drawing other objects and quantities. Alternatively or additionally, users of the online system 140 and/or pickers associated with the online system 140 may tune the LLM with their own images of containers with various quantities of items. The users and/or the pickers can then manually rate output images generated by the LLM, which may be then used for re-tuning of the LLM.

In one or more embodiments, users of the online system 140 can submit images of final filled containers, which can be then compared against the LLM's generated imagery for accuracy. For example, the users may be prompted to rate the accuracy of images generated by the LLM, which may be then used for re-tuning of the LLM. Alternatively or additionally, pickers associated with the online system 140 may be shown with the images generated by the LLM alongside an order they are expected to fulfill and asked to rate the accuracy of the generated images. For example, a picker associated with the online system 140 can utilize the smart shopping cart for fulfilling an order. Once the picker has picked up a desired quantity of an item and put the item into the smart shopping cart, there now exists an exact image of the delivered item and its exact mass (e.g., obtained via camera(s) and weight sensor(s) of the smart shopping cart), which can be compared against an image generated by the LLM and utilized for re-tuning of the LLM.

FIG. 3A illustrates example user interfaces of the user client device 100 with images of an item (e.g., caramel corn) with different selected quantities as generated by an LLM (e.g., LLM of the model serving system 150), in accordance with one or more embodiments. The image generation module 260 (or, alternatively, the content presentation module 210) may import an image of a selected quantity of an item that was generated by the LLM. A user interface 300 in FIG. 3A shows a quantity selection user interface element 305 that can be utilized by a user of the online system 140 to select a desired quantity of an item (e.g., 100 g of the caramel corn). The user interface 300 further shows a reference object user interface element 310 that can be utilized by the user to select a desired container for the item (e.g., bucket). The quantity of the item and the desired container as selected by the user, as well as information about the item, may be provided (e.g., via the prompt generation module 250) as a prompt input into the LLM. Based on the prompt input into the LLM, the LLM may generate an image 315 of the item (e.g., caramel corn) of the selected quantity (e.g., 100 g) in the desired container (e.g., bucket).

The user can utilize the quantity selection user interface element 305 to select a different quantity of the item (e.g., 500 g of caramel corn instead of 100 g). The selected different quantity of the item may be included (e.g., via the prompt generation module 250) into an updated prompt for input into the LLM. Based on the updated prompt input into the LLM, the LLM may generate an updated image 325 of the item of the selected different quantity (e.g., 500 g of caramel corn) in the desired container (e.g., bucket). The updated image 325 may be displayed (e.g., via the image generation module 260 or the content presentation module 210) as part of an updated user interface 320 of the user client device 100. The updated user interface 320 also shows the reference object user interface element 310 with different selection options for the container in addition to the previously selected bucket (e.g., bowl, half-sheet, deli container, etc.). Every time the user selects a different container type via the reference object user interface element 310, a new prompt for input into the LLM is generated and the LLM is prompted to generate an updated image of the item in a selected container type. And the updated image of the item may be then displayed in an updated user interface.

FIG. 3B illustrates an example user interface 350 of the user client device 100 that allows a user of the online system 140 to take and upload an image of a container, in accordance with one or more embodiments. The user may utilize a camera of the user client device 100 to take an image of a container (e.g., bucket), and may utilize the user interface 350 to upload the image of the container to the online system 140, which can be then input as part of a prompt into an LLM (e.g., the LLM of the model serving system 150). The user may further utilize a quantity selection user interface element 355 to select a quantity of an item (e.g., 500 g of caramel corn), as well as a reference object user interface element 360 to select a type of a container that corresponds to the type of the container whose image was taken and uploaded by the user. The selected quantity of the item, information about the desired container and the image of the container taken and uploaded by the user may be provided (e.g., via the prompt generation module 250) as a prompt input into the LLM. Based on the prompt input into the LLM, the LLM may generate an image of the item of the selected quantity in the container whose image was taken and uploaded by the user (e.g., 500 g of caramel corn in a user's bucket).

Figure 4:
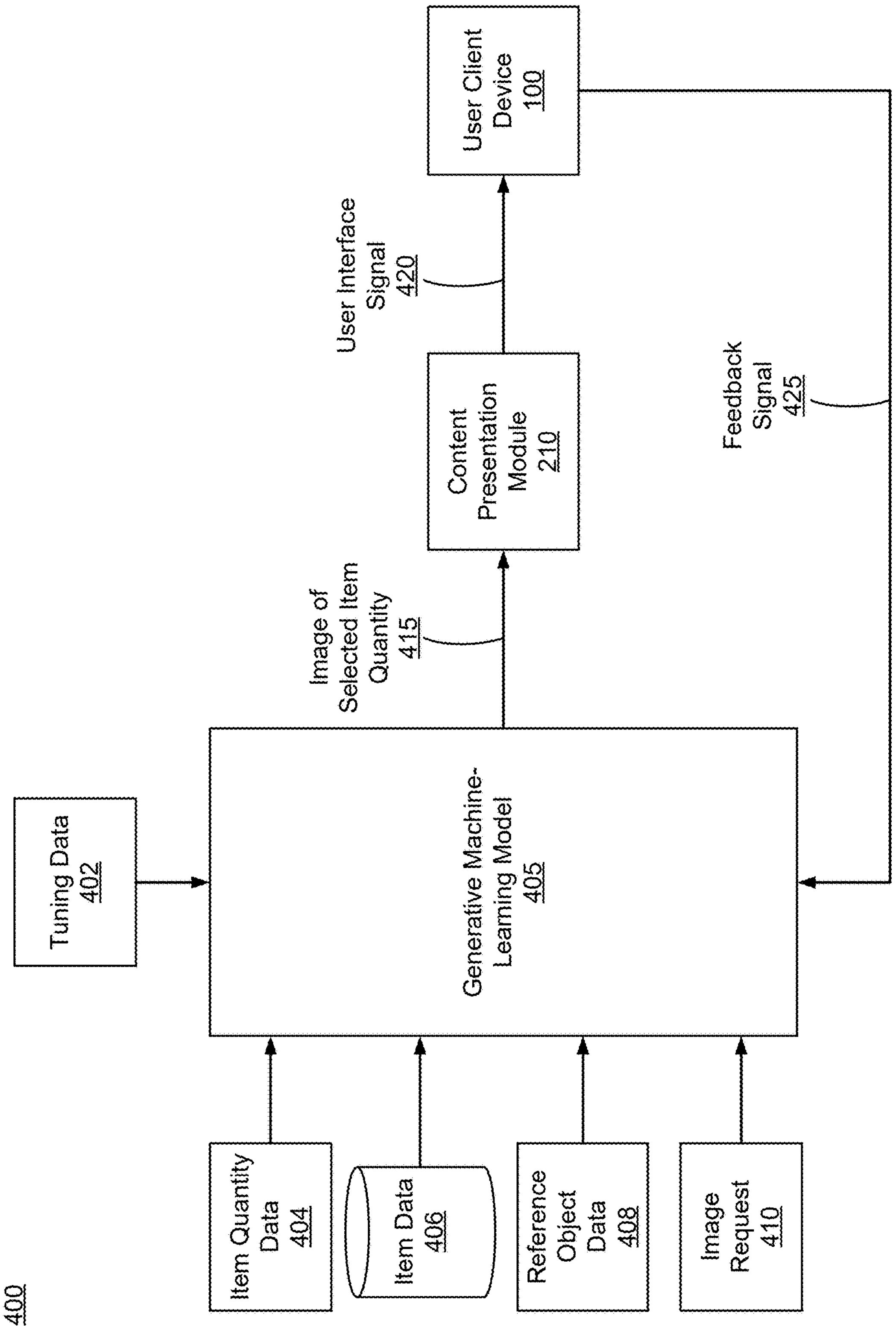
FIG. 4 illustrates an example architectural flow diagram of operating a generative machine-learning model (e.g., language model) to generate a user interface of an online system with visualization of items of selected quantities, in accordance with one or more embodiments.

FIG. 4 illustrates an example architectural flow diagram 400 of operating a generative machine-learning model 405 (e.g., language model or LLM of the model serving system 150) to generate a user interface of the online system 140 with visualization of items of selected quantities, in accordance with one or more embodiments. First, the model serving system 150 (or the online system 140 that integrates the model serving system 150) may perform initial tuning (or training) of the generative machine-learning model 405 using tuning data 402 to generate initial values for a set of parameters of the generative machine-learning model 405. The tuning data 402 may include a collection of images of known quantities of items in various types of containers (i.e., reference objects) and/or a collection of users' (or pickers') images of containers with various known quantities of items. After the initial tuning process is completed, the online system 140 may provide various inputs to the generative machine-learning model 405 (e.g., via the prompt generation module), such as item quantity data 404, item data 406, reference object data, and/or an image request 410. Some additional input data not shown in FIG. 4 suitable for generating an image of a desired quantity of item in a reference object (or next to the reference object) may be further provided to the generative machine-learning model 405.

In providing the item quantity data 402 to the generative machine-learning model 405, the prompt generation module 250 may provide information about a quantity of an item as selected by a user of the online system 140 via a user interface of the user client device 100 using, e.g., a quantity selection user interface element of the user interface. In providing the item data 406 to the generative machine-learning model 405, the prompt generation module 250 information about one or more features of the item, such as information about a type of the item, information about a purchase history of the user in relation to the item, etc. The prompt generation module 250 may retrieve the item data 406 from an item catalog database stored at, e.g., the data store 240.

In providing the reference object data 408 to the generative machine-learning model 405, the prompt generation module 250 may provide information about a reference object (i.e., container) selected by the user via the user interface of the user client device 100, e.g., using a reference object selection user interface element of the user interface. Upon selection of the reference object, the prompt generation module 250 may further retrieve an image of the selected reference object, e.g., from the item catalog database of the data store 240. Alternatively, the reference object data 408 may include an image of the reference object as uploaded by the user via the user interface of the user client device 100. Additionally, the prompt generation module 250 may input the image request 410 to the generative machine-learning model 405 with an explicit request for the generative machine-learning model 405 to generate an image of the selected quantity of the item. In one or more embodiments, the request for the generative machine-learning model 405 to generate an image of the selected quantity of the item is triggered based on the item data 406, i.e., information about a type of the item (i.e., the request for image may be triggered only for specific types of weighted items) or information about the user's purchase history of the item (i.e., the request for image may be triggered only for items that are not often purchased by the user).

Based on the item quantity data 404, the item data 406, the reference object data 408 and/or the image request 410, the generative machine-learning model 405 may generate an image of selected item quantity 415. The generative machine-learning model 405 may then pass the generated image of selected item quantity 415 to the content presentation module 210. The content presentation module 210 may generate, using the image of selected item quantity 415, a user interface signal 420 for the user client device 100 causing a user interface of the user client device 100 to display the generated image of selected item quantity 415 in the reference object (or next to the reference object) and next to the quantity selection user interface element.

In one or more embodiments, the user provides feedback in relation to the generated image of selected item quantity 415 via the user interface of the user client device 100, wherein the feedback includes information about a user's level of satisfaction about the generated image of selected item quantity 415, such as information about the user's grading of the generated image of selected item quantity 415. The user's feedback may be recorded at the user client device 100 as a feedback signal 425. The feedback signal 425 may be then imported via the network 130 to the model serving system 150 and used for re-tuning of the generative machine-learning model 405.

Figure 5:
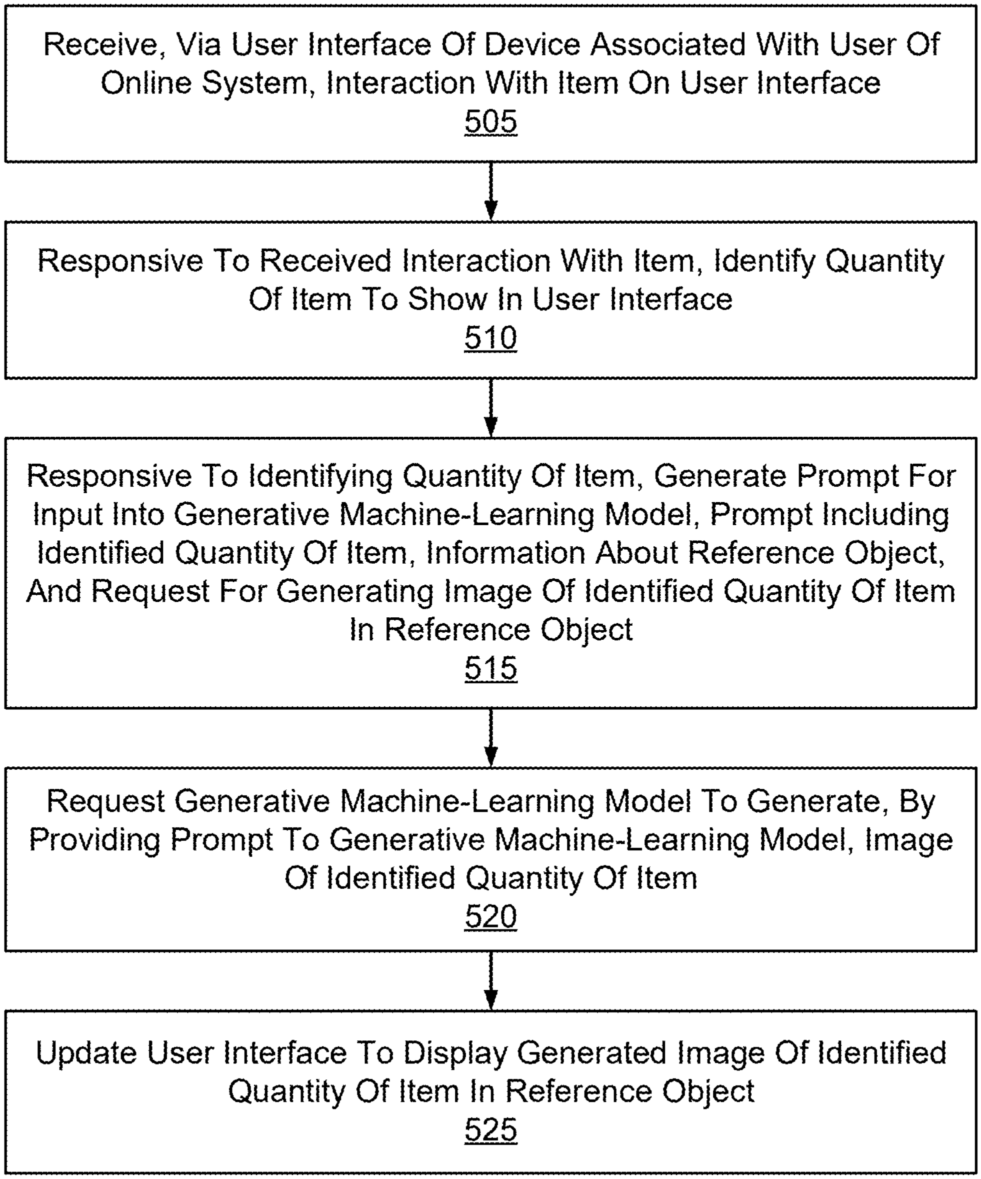
FIG. 5 is a flowchart for a method of operating a generative machine-learning model (e.g., language model) to generate a user interface of an online system with visualization of items of selected quantities, in accordance with one or more embodiments.

FIG. 5 is a flowchart for a method of operating a generative machine-learning model (e.g., language model or LLM of the model serving system 150) to generate a user interface of an online system with visualization of items (e.g., weighted items) of selected quantities. Alternative embodiments may include more, fewer, or different steps from those illustrated in FIG. 5, and the steps may be performed in a different order from that illustrated in FIG. 5. These steps may be performed by an online system (e.g., the online system 140). Additionally, each of these steps may be performed automatically by the online system without human intervention.

The online system 140 receives 505 (e.g., via the order management module 220), via a user interface of the user client device 100, an interaction with an item on the user interface. Responsive to the received interaction with the item, the online system 140 identifies 510 (e.g., via the order management module 220 or the content presentation module 210) a quantity of the item to show in the user interface.

Responsive to identifying the quantity of the item, the online system 140 generates 515 (e.g., via the prompt generation module 250) a prompt for input into a generative machine-learning model, the prompt including the identified quantity of the item, information about a reference object, and a request for generating an image of the identified quantity of the item in the reference object. The online system 140 requests 520 (e.g., via the prompt generation module 250) the generative machine-learning model to generate, by providing the prompt to the generative machine-learning model, the image of the identified quantity of the item. The online system 140 updates 525 (e.g., via the image generation module 260 or the content presentation module 210) the user interface to display the generated image of the identified quantity of the item in the reference object.

Responsive to the received interaction with the item, the online system 140 may update (e.g., via the content presentation module 210) the user interface to display a quantity selection user interface element for selection of the quantity of the item. The online system 140 may receive (e.g., via the order management module 220), via the user interface, information about the quantity of the item selected using the quantity selection user interface element. The online system 140 may identify (e.g., via the order management module 220 or the content presentation module 210), based on the information about the quantity of the item, the quantity of the item. The online system 140 may update (e.g., via the content presentation module 210) the user interface to display the generated image of the selected quantity of the item in the reference object and associated with the quantity selection user interface element.

Alternatively, the online system 140 may receive (e.g., via the order management module 220), via the user interface, information about the quantity of the item corresponding to a predetermined default quantity of the item. The online system 140 may identify (e.g., via the order management module 220 or the content presentation module 210), based on the predetermined default quantity of the item, the quantity of the item.

The online system 140 may trigger (e.g., via the prompt generation module 250), based on a classification (e.g., taxonomy node) of the item, the request for the generative machine-learning model to generate the image of the identified quantity of the item. Alternatively, the online system 140 may trigger (e.g., via the prompt generation module 250), based on user data (e.g., purchase history of the user) in relation to the item, the request for the generative machine-learning model to generate the image of the identified quantity of the item.

The online system 140 may receive (e.g., via the prompt generation module 250), via the user interface, a selection of the reference object, wherein the reference object was selected using a reference object selection user interface element of the user interface. The online system 140 may include (e.g., via the prompt generation module 250) an image of the selected reference object and information about a size of the selected reference object into the prompt. Alternatively or additionally, the online system 140 may receive (e.g., via the prompt generation module 250), via the user interface, an image of the reference object. The online system 140 may include (e.g., via the prompt generation module 250) the received image of the reference object into the prompt. Alternatively or additionally, the online system 140 may extract (e.g., via the prompt generation module 250), via the user interface, information about measurements of the reference object. The online system 140 may include (e.g., via the prompt generation module 250) the information about measurements of the reference object into the prompt.

The online system 140 may receive (e.g., via the prompt generation module 250), via the user interface, information about an updated quantity of the item selected using a quantity selection user interface element of the user interface. Responsive to the updated quantity of the item, the online system 140 may generate (e.g., via the prompt generation module 250) an updated prompt for input into the generative machine-learning model, the updated prompt including the updated quantity of the item, the information about the reference object, and an updated request for generating an updated image of the updated quantity of the item in the reference object and associated with the quantity selection user interface element. The online system 140 may request the generative machine-learning model (e.g., via the prompt generation module 250) to generate, by providing the updated prompt to the generative machine-learning model, the updated image of the updated quantity of the item. The online system 140 may update (e.g., via the image generation module 260 or the content presentation module 210) the user interface to display the generated updated image of the updated quantity of the item in the reference object and associated with the quantity selection user interface element.

The online system 140 may receive (e.g., via the prompt generation module 250), via the user interface, a selection of an updated reference object, wherein the updated reference object was selected using a reference object selection user interface element of the user interface. Responsive to the selection of the updated reference object, the online system 140 may generate (e.g., via the prompt generation module 250) an updated prompt for input into the generative machine-learning model, the updated prompt including the identified quantity of the item, information about the updated reference object, and an updated request for generating an updated image of the identified quantity of the item in the updated reference object. The online system 140 may request the generative machine-learning model (e.g., via the prompt generation module 250) to generate, by providing the updated prompt to the generative machine-learning model, the updated image of the identified quantity of the item. The online system 140 may update (e.g., via the image generation module 260 or the content presentation module 210) the user interface to display the generated updated image of the identified quantity of the item in the updated reference object.

The online system 140 may tune the generative machine-learning model (e.g., via the model serving system 150 or the machine-learning training module 230) using a collection of images of known item quantities in a plurality of types of reference objects. Alternatively or additionally, the online system 140 may receive (e.g., via the data collection module 200), via the user interface, a plurality of images of known item quantities in one or more reference objects. The online system 140 may tune the generative machine-learning model (e.g., via the model serving system 150 or the machine-learning training module 230) using the received plurality of images. Additionally, the online system 140 may receive (e.g., machine-learning training module 230), via the user interface, feedback from the user about the generated image of the identified quantity of the item. The online system 140 may re-tune the generative machine-learning model (e.g., via the model serving system 150 or the machine-learning training module 230) based on the received feedback.

Embodiments of the present disclosure are directed to the online system 140 that utilizes a generative machine-learning model (e.g., language model or LLM) that is tuned to generate a user interface of the online system 140 that displays an image of an item having a quantity that was previously selected by a user of the online system 140 via the user interface. The user interface is updated to show an updated image of the item when a selected quantity of the item is updated.

ADDITIONAL CONSIDERATIONS

The foregoing description of the embodiments has been presented for the purpose of illustration; many modifications and variations are possible while remaining within the principles and teachings of the above description.

Any of the steps, operations, or processes described herein may be performed or implemented with one or more hardware or software modules, alone or in combination with other devices. In some embodiments, a software module is implemented with a computer program product comprising one or more computer-readable media storing computer program code or instructions, which can be executed by a computer processor for performing any or all of the steps, operations, or processes described. In some embodiments, a computer-readable medium comprises one or more computer-readable media that, individually or together, comprise instructions that, when executed by one or more processors, cause the one or more processors to perform, individually or together, the steps of the instructions stored on the one or more computer-readable media. Similarly, a processor comprises one or more processors or processing units that, individually or together, perform the steps of instructions stored on a computer-readable medium.

Embodiments may also relate to a product that is produced by a computing process described herein. Such a product may store information resulting from a computing process, where the information is stored on a non-transitory, tangible computer-readable medium and may include a computer program product or other data combination described herein.

The description herein may describe processes and systems that use machine-learning models in the performance of their described functionalities. A "machine-learning model," as used herein, comprises one or more machine-learning models that perform the described functionality. Machine-learning models may be stored on one or more computer-readable media with a set of weights. These weights are parameters used by the machine-learning model to transform input data received by the model into output data. The weights may be generated through a training process, whereby the machine-learning model is trained based on a set of training examples and labels associated with the training examples. The training process may include: applying the machine-learning model to a training example, comparing an output of the machine-learning model to the label associated with the training example, and updating weights associated with the machine-learning model through a back-propagation process. The weights may be stored on one or more computer-readable media, and are used by a system when applying the machine-learning model to new data.

The language used in the specification has been principally selected for readability and instructional purposes, and it may not have been selected to narrow the inventive subject matter. It is therefore intended that the scope of the patent rights be limited not by this detailed description, but rather by any claims that issue on an application based hereon.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive "or" and not to an exclusive "or." For example, a condition "A or B" is satisfied by any one of the following: A is true (or present) and B is false (or not present); A is false (or not present) and B is true (or present); and both A and B are true (or present). Similarly, a condition "A, B, or C" is satisfied by any combination of A, B, and C being true (or present). As a non-limiting example, the condition "A, B, or C" is satisfied when A and B are true (or present) and C is false (or not present). Similarly, as another non-limiting example, the condition "A, B, or C" is satisfied when A is true (or present) and B and C are false (or not present).

What is claimed is:

1. A method, performed at a computer system comprising a processor and a computer-readable medium, comprising:

receiving, via a user interface of a device associated with a user of an online system, an interaction with an item on the user interface;

responsive to the received interaction with the item, identifying a quantity of the item to show in the user interface;

selecting, via the user interface, a reference object from different types of containers;

responsive to identifying the quantity of the item, generating a prompt for input into a generative machine-learning model, the prompt including the identified quantity of the item, information about the selected reference object, and a request for generating an image of the identified quantity of the item in the reference object;

requesting the generative machine-learning model to generate, by providing the prompt to the generative machine-learning model, the image of the identified quantity of the item; and updating the user interface to display the generated image of the identified quantity of the item in the reference object.

2. The method of claim 1, wherein identifying the quantity of the item comprises:

responsive to the received interaction with the item, updating the user interface to display a quantity selection user interface element for selection of the quantity of the item;

receiving, via the user interface, information about the quantity of the item selected using the quantity selection user interface element; and identifying, based on the information about the quantity of the item, the quantity of the item.

3. The method of claim 2, wherein updating the user interface comprises:

updating the user interface to display the generated image of the selected quantity of the item in the reference object and associated with the quantity selection user interface element.

4. The method of claim 1, wherein identifying the quantity of the item comprises:

receiving, via the user interface, information about the quantity of the item corresponding to a predetermined default quantity of the item; and identifying, based on the predetermined default quantity of the item, the quantity of the item.

5. The method of claim 1, further comprising:

triggering, based on a classification of the item, the request for the generative machine-learning model to generate the image of the identified quantity of the item.

6. The method of claim 1, further comprising:

triggering, based on user data in relation to the item, the request for the generative machine-learning model to generate the image of the identified quantity of the item.

7. The method of claim 1, wherein generating the prompt for input into the generative machine-learning model comprises:

including an image of the selected reference object and information about a size of the selected reference object into the prompt.

8. The method of claim 1, wherein generating the prompt for input into the generative machine-learning model further comprises:

receiving, via the user interface, an image of the selected reference object; and including the received image of the selected reference object into the prompt.

9. The method of claim 1, wherein generating the prompt for input into the generative machine-learning model further comprises:

extracting, via the user interface, information about measurements of the selected reference object; and including the information about measurements of the selected reference object into the prompt.

10. The method of claim 1, further comprising:

receiving, via the user interface, information about an updated quantity of the item selected using a quantity selection user interface element of the user interface;

responsive to the updated quantity of the item, generating an updated prompt for input into the generative machine-learning model, the updated prompt including the updated quantity of the item, the information about the selected reference object, and an updated request for generating an updated image of the updated quantity of the item in the reference object and associated with the quantity selection user interface element;

requesting the generative machine-learning model to generate, by providing the updated prompt to the generative machine-learning model, the updated image of the updated quantity of the item; and updating the user interface to display the generated updated image of the updated quantity of the item in the reference object and associated with the quantity selection user interface element.

11. The method of claim 1, further comprising:

receiving, via the user interface, a selection of an updated reference object, wherein the updated reference object was selected using a reference object selection user interface element of the user interface;

responsive to the selection of the updated reference object, generating an updated prompt for input into the generative machine-learning model, the updated prompt including the identified quantity of the item, information about the updated reference object, and an updated request for generating an updated image of the identified quantity of the item in the updated reference object;

requesting the generative machine-learning model to generate, by providing the updated prompt to the generative machine-learning model, the updated image of the identified quantity of the item; and updating the user interface to display the generated updated image of the identified quantity of the item in the updated reference object.

12. The method of claim 1, further comprising:

tuning the generative machine-learning model using a collection of images of known item quantities in a plurality of types of reference objects.

13. The method of claim 1, further comprising:

receiving, via the user interface, a plurality of images of known item quantities in one or more reference objects; and tuning the generative machine-learning model using the received plurality of images;

receiving, via the user interface, feedback about the generated image of the identified quantity of the item;

re-tuning the generative machine-learning model based on the received feedback.

14. A computer program product comprising a non-transitory computer readable storage medium having instructions encoded thereon that, when executed by a processor, cause the processor to perform steps comprising:

receiving, via a user interface of a device associated with a user of an online system, an interaction with an item on the user interface;

responsive to the received interaction with the item, identifying a quantity of the item to show in the user interface;

selecting, via the user interface, a reference object from different types of containers;

responsive to identifying the quantity of the item, generating a prompt for input into a generative machine-learning model, the prompt including the identified quantity of the item, information about the selected reference object, and a request for generating an image of the identified quantity of the item in the reference object;

requesting the generative machine-learning model to generate, by providing the prompt to the generative machine-learning model, the image of the identified quantity of the item; and updating the user interface to display the generated image of the identified quantity of the item in the reference object.

15. The computer program product of claim 14, wherein the instructions further cause the processor to perform steps comprising:

responsive to the received interaction with the item, updating the user interface to display a quantity selection user interface element for selection of the quantity of the item;

receiving, via the user interface, information about the quantity of the item selected using the quantity selection user interface element; and updating the user interface to display the generated image of the selected quantity of the item in the reference object and associated with the quantity selection user interface element.

16. The computer program product of claim 14, wherein the instructions further cause the processor to perform steps comprising:

generating the prompt for input into the generative machine-learning model by including an image of the selected reference object and information about a size of the selected reference object into the prompt.

17. The computer program product of claim 14, wherein the instructions further cause the processor to perform steps comprising:

receiving, via the user interface, information about an updated quantity of the item selected using a quantity selection user interface element of the user interface;

responsive to the updated quantity of the item, generating an updated prompt for input into the generative machine-learning model, the updated prompt including the updated quantity of the item, the information about the selected reference object, and an updated request for generating an updated image of the updated quantity of the item in the reference object and associated with the quantity selection user interface element;

requesting the generative machine-learning model to generate, by providing the updated prompt to the generative machine-learning model, the updated image of the updated quantity of the item; and updating the user interface to display the generated updated image of the updated quantity of the item in the reference object and associated with the quantity selection user interface element.

18. The computer program product of claim 14, wherein the instructions further cause the processor to perform steps comprising:

receiving, via the user interface, a selection of an updated reference object, wherein the updated reference object was selected using a reference object selection user interface element of the user interface;

responsive to the selection of the updated reference object, generating an updated prompt for input into the generative machine-learning model, the updated prompt including the identified quantity of the item, information about the updated reference object, and an updated request for generating an updated image of the identified quantity of the item in the updated reference object;

requesting the generative machine-learning model to generate, by providing the updated prompt to the generative machine-learning model, the updated image of the identified quantity of the item; and updating the user interface to display the generated updated image of the identified quantity of the item in the updated reference object.

19. The computer program product of claim 14, wherein the instructions further cause the processor to perform steps comprising:

tuning the generative machine-learning model using a collection of images of known item quantities in a plurality of types of reference objects;

receiving, via the user interface, feedback about the generated image of the identified quantity of the item; and re-tuning the generative machine-learning model based on the received feedback.

20. A computer system comprising:

a processor; and a non-transitory computer-readable storage medium having instructions that, when executed by the processor, cause the computer system to perform steps comprising:

receiving, via a user interface of a device associated with a user of an online system, an interaction with an item on the user interface;

responsive to the received interaction with the item, identifying a quantity of the item to show in the user interface;

selecting, via the user interface, a reference object from different types of containers;

responsive to identifying the quantity of the item, generating a prompt for input into a generative machine-learning model, the prompt including the identified quantity of the item, information about the selected reference object, and a request for generating an image of the identified quantity of the item in the reference object;

requesting the generative machine-learning model to generate, by providing the prompt to the generative machine-learning model, the image of the identified quantity of the item; and updating the user interface to display the generated image of the identified quantity of the item in the reference object.

* * * * *